G. P. BUMP.
LOOP FORMING TERMINAL CLAMP.
APPLICATION FILED APR. 15, 1922.
1,422,660.
Patented July 11, 1922.
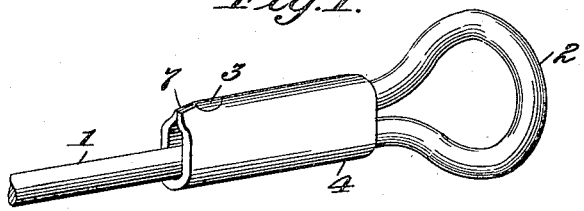
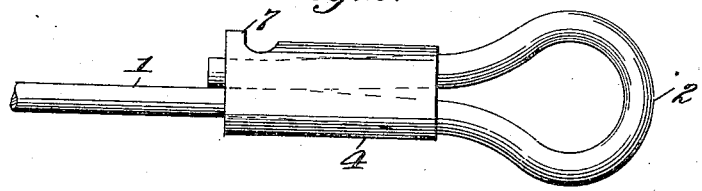
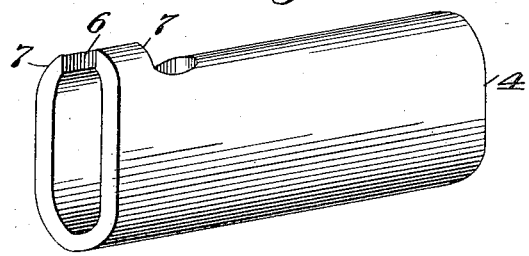
Inventor:
George P. Bump
by Geo. E. Evans
Atty.

UNITED STATES PATENT OFFICE.

GEORGE P. BUMP, OF LA CROSSE, WISCONSIN.

LOOP-FORMING TERMINAL CLAMP.

1,422,660.    Specification of Letters Patent.    Patented July 11, 1922.

Application filed April 15, 1922. Serial No. 553,102.

*To all whom it may concern:*

Be it known that I, GEORGE P. BUMP, a citizen of the United States, residing at La Crosse, in the county of La Crosse and State of Wisconsin, have invented certain new and useful Improvements in Loop-Forming Terminal Clamps, of which the following is a specification.

My invention relates to clamps for forming loops or eyes at the ends of wire or other flexible strands.

The object of the invention is to provide a simple and inexpensive clamp for securing overlapped portions of a wire or other flexible strands to form eyes or loops wherein the clamp will hold the free end of the wire rigidly against slipping and pulling out and wherein a loop or eye so formed will hold more securely than where the free end of the wire is twisted around and wherein the loop or eye may be formed in places where it would not be possible to wind or twist the wire.

The clamp comprises a flattened sleeve or tube just wide enough to receive a doubled over wire and provided at its outer end with an open slot to receive the upturned extremity of the free end of a wire; the outer end of the slot being closed by a lug or ear adapted to be bent across the same.

This object I accomplish by the construction shown in the accompanying drawing, in which:

Fig. 1 shows my improved clamp as it appears on a wire in holding the loop.

Fig. 2 shows the wire bent upon itself to form the eye or loop with the clamp or clip in place prior to the bending up of the extremity of the wire.

Fig. 3 is an enlarged perspective of the clamp or clip.

The wire 1 is bent upon itself to form the eye or loop 2. The clip or clamp 4 is now moved along the wire 1 until it passes upon the two overlapped portions of the wire. The clamp or clip 4 is formed as a flattened tube just wide enough to snugly receive the overlapped portions of the wire and its upper side at the rear end is formed with a slot 6 to receive the bent up end 3 of wire 1. The outer ends of the walls of slot 6 are provided with lugs 7—7 which are bent towards each other and so close the slot and form a stop engaging the upturned end 3 of the wire so that the end is locked in place and held against movement in either direction.

The lugs 7—7 may be readily bent to close the slot by a pair of pincers or pliers.

It will be seen, therefore, that I have provided a clamp or clip capable of locking the free extremity of a wire or strand against pulling or pushing and that this clamp or clip may be placed in position on the wire before it is bent over to form the loop and then slipped back over the doubled or overlapped portions and locked as described. This may be accomplished in situations where wrapping the free end would be impossible.

The clamps or clips may be made up in sizes to be used on various gages of wire and the like.

I am aware that it is not broadly new to secure the overlapped portions of a wire by a simple sleeve, but the slotted sleeve and means for closing the outer open end of the slot I believe to be new.

What I claim is:

1. A terminal clip or clamp comprising a tube to be slipped along a wire bent upon itself to form a loop; said tube having an open slot at one end into which the free end of said wire may be bent laterally, and the ends of the slot walls at the open end of the slot being constructed to be closed inwardly behind said laterally bent end to lock it in place.

2. A terminal clip or clamp comprising a flattened tube or sleeve to snugly receive the overlapped end of a wire or strand, and provided at one end with a longitudinal open slot to receive the laterally bent end of a wire, and a lug or ear projecting from the sleeve at the outer portion of said slot and adapted to be bent over and close the slot.

3. A terminal clip or clamp comprising a tube or sleeve having an open slot in one end; the walls of the slot at the outer end thereof having lugs adapted to be bent over and close the outer end of the slot.

4. A wire terminal comprising a wire bent upon itself to form a loop, a tubular clamp or clip snugly inclosing the overlapped portions of the wire or strand and provided with an open slot at its outer end; the extremity of the wire projecting laterally through the slot at its closed end and the open end of the slot being closed around the said lateral extremity.

In testimony whereof I affix my signature.

GEORGE P. BUMP.